(12) United States Patent
Haar et al.

(10) Patent No.: US 11,958,595 B2
(45) Date of Patent: Apr. 16, 2024

(54) ACTUATOR FOR AVIATION APPLICATIONS

(71) Applicant: AIRBUS HELICOPTERS TECHNIK GMBH, Calden (DE)

(72) Inventors: Jan Haar, Ahnatal (DE); Uwe Arnold, Kassel (DE); Martin Meunier, Kassel (DE); Carsten Wintjen, Grebenstein (DE); Matthias Müller, Kassel (DE); Werner Pflüger, Ahnatal (DE)

(73) Assignee: AIRBUS HELICOPTERS TECHNIK GMBH, Calden (DE)

( * ) Notice: Subject to any disclaimer, the term of this patent is extended or adjusted under 35 U.S.C. 154(b) by 0 days.

(21) Appl. No.: 17/996,398

(22) PCT Filed: Apr. 15, 2021

(86) PCT No.: PCT/EP2021/059802
§ 371 (c)(1),
(2) Date: Oct. 17, 2022

(87) PCT Pub. No.: WO2021/209560
PCT Pub. Date: Oct. 21, 2021

(65) Prior Publication Data
US 2023/0202649 A1     Jun. 29, 2023

(30) Foreign Application Priority Data
Apr. 17, 2020   (DE) .......................... 102020204915.7

(51) Int. Cl.
*B64C 27/68*    (2006.01)
*B64C 27/04*    (2006.01)
(52) U.S. Cl.
CPC .............. *B64C 27/68* (2013.01); *B64C 27/04* (2013.01)

(58) Field of Classification Search
CPC ....... B64C 27/68; B64C 27/04; B64C 13/505; B64C 13/341; F16H 49/001
See application file for complete search history.

(56) References Cited

U.S. PATENT DOCUMENTS 3,986,412 A * 10/1976 Farley ................... F16H 49/001
475/5
10,077,102 B1    9/2018 Birch et al.
(Continued)

FOREIGN PATENT DOCUMENTS

DE         102015203411 A1    9/2016

OTHER PUBLICATIONS

International Search Report and Written Opinion of the International Search Authority dated Jul. 27, 2021 in International Application No. PCT/EP2021/059802 (English and German languages) (13 pp.).

(Continued)

*Primary Examiner* — Jacob M Amick
*Assistant Examiner* — Charles J Brauch
(74) *Attorney, Agent, or Firm* — BROOKS KUSHMAN P.C.

(57) ABSTRACT

An actuator for aviation applications, in particular for adjusting rotor blades in a helicopter, may include an electromechanical drive assembly connected to an output drive via a downstream transmission, where the drive assembly is divided into sub-drives that can be operated independently, and where at least two sub-drives are spatially separated from one another in that the transmission is placed between these sub-drives. The transmission may include at least two harmonic gearings coupled to one another by at least one first coupling element, where a first harmonic gearing is located inside a non-rotating first housing, where a second harmonic gearing is located inside a rotating second hous- (Continued)

Stand der Technik ing, and where the second housing is connected to the output drive.

20 Claims, 8 Drawing Sheets

(56) References Cited

U.S. PATENT DOCUMENTS

| | | |
|---|---|---|
| 2010/0038478 A1 | 2/2010 | Knight |
| 2010/0150719 A1 | 6/2010 | Waide et al. |
| 2010/0249444 A1 | 9/2010 | Lee et al. |
| 2013/0038478 A1 | 2/2013 | Souchkov |
| 2013/0249444 A1 | 9/2013 | Golding |
| 2014/0033840 A1 | 2/2014 | Yokoyama |
| 2014/0076252 A1 | 3/2014 | Burke et al. |
| 2017/0350491 A1 | 12/2017 | Wilkens |
| 2019/0382108 A1 | 12/2019 | Götte et al. |

OTHER PUBLICATIONS

International Search Report for Application No. PCT/EP2021/059802, Completed Jul. 16, 2021, 13 pages.

* cited by examiner

Fig. 1 Stand der Technik

ACTUATOR FOR AVIATION APPLICATIONS

RELATED APPLICATION(S)

This application is a filing under 35 U.S.C. § 371 of International Patent Application PCT/EP2021/059802, filed Apr. 15, 2021, and claiming priority to German Patent Application DE 10 2020 204 915.7, filed Apr. 17, 2020. All applications listed in this paragraph are hereby incorporated by reference in their entireties.

TECHNICAL FIELD

The invention relates to an actuator for aviation applications, in particular for adjusting rotor blades in a helicopter, comprising a drive assembly for an electric machine that is connected to the output drive by a transmission, in which the drive assembly is subdivided into independent sub-drives. Such an actuator can be used in a helicopter as well as in an airplane.

BACKGROUND

Actuators are used in aircraft for converting control commands from a pilot into corresponding control functions. As such, actuators are used in helicopters for adjusting the rotor blades, and trigger their axial displacement to a rotor mast and their lateral tilt in relation to the rotor mast at a swashplate in a targeted manner, such that a collective blade adjustment is obtained in the first case, and in the second case a cyclical adjustment is obtained. Because any failure of the actuators could result in the aircraft crashing, depending on which control commands are implemented therewith, actuators are designed as redundant systems, such that they are still at least functional to a limited extent when individual components malfunction.

An actuator for aviation applications is known from DE 10 2015 203 411 A1 and DE 10 2015 203 411 A1 discloses an actuator for adjusting the rotor blades in a helicopter that comprises an electromechanical drive assembly that is connected to the output drive by a downstream transmission. The drive assembly is subdivided into sub-drives that can be operated independently. To reduce the susceptibility of the actuator to damage, there are at least two sub-drives that are separated spatially in that the transmission is located between these sub-drives. The transmission is formed by a planetary gear assembly or a cycloidal drive.

US 2010/0150719 A1 discloses an actuator for adjusting rotor blades in a helicopter in which the actuator is composed of an electromechanical drive assembly and a downstream transmission. The drive assembly is in the form of a redundant multi-phase electric motor which combines numerous independent sub-drives in a housing.

BRIEF DESCRIPTION OF THE DRAWINGS

Certain preferred embodiments are shown in the drawings, and shall be explained below. Therein.

DETAILED DESCRIPTION

Based on the background described above, an object of the present invention is to create an actuator for aviation applications that is distinguished by an even lower susceptibility to damage and is therefore more reliable, or less likely to malfunction.

According to the invention, an actuator for aviation applications comprises an electromechanical drive assembly that is connected to an output drive by a downstream transmission. This drive assembly is subdivided into sub-drives that can be operated independently. The actuator according to the invention is used in particular for adjusting the rotor blades in a helicopter, and can be used for either moving a swashplate, via which the rotor blades in the helicopter are adjusted collectively, or for adjusting the blades individually, in which case the actuator is then located between a single blade and the rotor head on the main rotor or the tail rotor. The actuator according to the invention can also be used elsewhere or with other aircraft such as airplanes, in which case it may be used for controlling the flaps or for operating a rudder such as an aileron or elevator.

In the framework of the invention, the sub-drives in the electromechanical drive assembly are operated independently in that each sub-drive is independently supplied with power, and can also be regulated independently. As such, each sub-drive has at least one generator with a downstream rectifier, depending on the number of phases, which is connected to the sub-drive by a power cable. In particular with sub-drives that have a high number of phases, there may be numerous generators, rectifiers and power cables for supplying the coils with electricity. The individual sub-drives are then regulated by one or more power drive electronics (PDE) assemblies, depending on the number of phases, which are controlled in turn by a dedicated actuator control unit (ACU). On the whole, the regulation thereof takes place with numerous flight control computers (FCC), which obtain information from numerous sensors.

The invention also comprises the technical teachings that the transmission is composed of at least two strain wave gearings, or harmonic gearings, that are connected to one another by at least one first coupling element, in which a first harmonic gearing is located inside a non-rotating housing, and a second harmonic gearing is located inside a second housing, which can rotate, and the second housing is connected to the output drive. In other words, the transmission is located between at least two sub-drives and therefore separates them from one another spatially in that the one sub-drive is on one side of the transmission and the other sub-drive is on the other side of the transmission.

This design for an actuator has the advantage that any damage to one of the sub-drives, e.g. caused by fire, is less likely to result in damage to the other sub-drive, because they are separated by the transmission. This reduces the susceptibility of the actuator to damage, thus increasing the overall reliability. Furthermore, the actuator forms a redundant system as a result of the independent sub-drives, which still remains functional even if individual components malfunction. In other words, the two redundant sub-drives are implemented such that control is still maintained with a single sub-drive.

If one of the sub-drives malfunctions, however, adjustments take place at half the speed. If a safety factor of at least two is incorporated in the adjustment speed, then the control function remains entirely intact.

A transmission with at least two harmonic gearings is used in the actuator. A harmonic gearing, also referred to as a strain wave gearing or by its trademark name, Harmonic Drive, is a transmission with an elastic transfer element, which is distinguished by a high gear ratio and its rigidity.

A harmonic gearing is fundamentally composed of three elements, specifically an elliptical steel disk, referred to as the wave generator, a flexible cylindrical steel bushing with external teeth, referred to as the flex spline, and a rigid cylindrical outer ring with internal teeth, referred to as the circular spline. The teeth in the circular spline engage with the teeth on the flex spline.

There are fewer external teeth on the flex spline than there are internal teeth in the circular spline. This normally amounts to a difference of two teeth. As a result, the relative movements of the flex spline and circular spline differ by two teeth with each complete rotation.

The wave generator deforms the thin-walled flex spline over the outer race of a ball bearing. As a result, the external teeth on the flex spline engage with the inner teeth in the circular spline at the ends of the longer axis of the ellipse. If the circular spline is kept stationary, the flex spline (output drive) rotates less in relation to the circular spline by the lower number of teeth when the wave generator makes a full rotation. As a result of the high number of small teeth, a very high gear ratio is obtained. The advantage of a harmonic gearing over the cycloidal drive known from the prior art is obtained through lower production expenditures.

The invention is also distinguished by a low weight due to the relatively small number of parts. The transmission also has a high gear reduction ratio and exhibits no backlash. It also has a high positioning and repeat accuracy. The actuator also exhibits a higher mean time between failures (MTBF). The actuator is compact. Lastly, it has fewer components that are susceptible to wear, such that it also exhibits less wear as a whole.

In accordance with one possible design, there are at least two sub-drives on each side of the transmission, preferably exactly two sub-drives. A total of exactly three sub-drives on each side is also preferred.

The one or more sub-drives on each side of the transmission are enclosed in a housing in order to prevent damage to the sub-drive(s) from the exterior.

According to one embodiment of the invention, the transmission has two drive shafts, and the at least one sub-drive on one side of the transmission is dedicated to one of the drive shafts, and the at least one sub-drive on the other side of the transmission is dedicated to the other drive shaft. The transmission then combines the drive powers of the sub-drives for the output drive. Even if one or more of the sub-drives on one side of the transmission are blocked, the actuator can still function.

If there are a total of two sub-drives, each sub-drive is always dedicated to a separate drive shaft, resulting in a transmission that has at least two drive shafts. This means that when there are only two sub-drives, they cannot be dedicated to the same drive shaft.

If there are four sub-drives, each one of these can be dedicated to separate shafts, such that there is a total of four drive shafts. It is also possible for each pair of sub-drives to be dedicated to one drive shaft, such that a total of two drive shafts are sufficient with four sub-drives.

The sub-drives can be combined to form drive units such that there is one drive unit on each side of the transmission. If there are two sub-drives, each drive unit comprises one sub-drive. If there are four sub-drives, each drive unit comprise two sub-drives.

A braking effect can be obtained without a locking element in that a drive unit brakes itself. This shall be explained in greater detail below:

If a sub-drive malfunctions, a braking effect can be obtained by short circuiting the motor phases in the malfunctioning sub-drive. The short circuit results in a phase current due to the voltage formed by the rotation of the motor shaft, which results in an electromagnetic braking torque that acts on the motor shaft of the sub-drive. It is therefore preferred that there are numerous means with which the motor phases can be short circuited in each sub-drive. This braking effect caused by short circuiting the motor phases can be obtained with an actuator that has two sub-drives as well as with an actuator that has four sub-drives.

With an actuator with four sub-drives, braking can be obtained without locking elements and without short circuiting the motor phases. For this, it is preferred when the functioning sub-drive is part of the same drive unit as the malfunctioning sub-drive, in particular such that it can be activated in a manner in which the output movement of the malfunctioning drive unit is "actively" braked. In other words, the malfunctioning drive unit brakes itself with the remaining sub-drive. A corresponding regulating algorithm is implemented in this embodiment. No additional hardware is necessary for this.

With an actuator that has four sub-drives, the "short circuiting method" can be combined with the "active" braking of the drive unit. This means that the malfunctioning sub-drive is short circuited while the functioning sub-drive brakes the same drive unit.

It is preferred when the first harmonic gearing has a first wave generator that can be driven by at least a first sub-drive, in which the first wave generator is located inside a first flex spline that is non-rotatably connected to the first transmission housing, where the first flex spline has a first set of external teeth, and the second harmonic gearing has a second wave generator inside a second flex spline that is non-rotatably connected to the second housing, wherein the second flex spline has a second set of external teeth, and the coupling element forms an integral circular spline, or a multi-part circular spline, and where the circular spline has one or more sets of internal teeth that correspond to the first and second external teeth.

The actuator can also have locking elements. It is preferred when there is at least one locking element on each side of the transmission, which is at the input drive side and is configured to hold the at least one sub-drive in place. There can also be at least one locking element one each side of the housing, which is at the input drive side and configured to prevent a relative movement between one of the two housings and the coupling element.

The locking elements are preferably in the form of brakes which brake when not supplied with power and are therefore referred to as "power off brakes."

If the brakes are not supplied with electricity, the corresponding shaft is stopped or kept stationary. One example of a brake that brakes when not suppled with electricity is an electromagnetic brake When the locking elements are at the input drive side they can stop the drive shaft in question in the case of a malfunction, thus preventing it from turning. If a locking element is located on the output drive, it can prevent relative movement between the stationary first housing and the coupling element in the case of a malfunction. Or it can prevent relative movement between the moving second housing and the coupling element.

In another embodiment of the invention, the actuator has two more harmonic gearings, thus increasing the redundancy.

An actuator is therefore preferred that comprises a third harmonic gearing and fourth harmonic gearing, which are located axially between the first and second harmonic gearings, in which there is a second coupling element, instead of the first coupling element, which couples the first and third harmonic gearings to one another, and there is a third coupling element that couples the second and fourth harmonic gearings to one another, and the second and third coupling elements are connected to one another for conjoint rotation.

The first and third harmonic gearings are preferably located in the non-rotating first housing, the second and fourth harmonic gearings are preferably located in the rotating second housing, and the first and second housing each preferably have numerous holes on their circumference, in particular slots extending along their circumference, through which connecting elements are inserted in order to connect the second and third coupling elements for conjoint rotation, such that the connecting elements are at least partially located outside the housing. This also means that the second housing can be designed such that it encompasses the connecting elements, and the interior is sealed against the environment with a seal formed on the housing.

There should be at least two holes. Three, four, five, six, seven and eight holes have proven to be advantageous. There can also be more holes. It is also preferable to have a multiple of two (n×2) or a multiple of two plus one ((n×2)+1) holes. A connecting element is then inserted through each of these holes. The angular extension of the holes should also be uniform, and the spacings therebetween should be the same.

By way of example, there can be four holes, each extending over 45°. There is then a housing section between each hole, which also extends over 45° of the circumference. There could also be six holes, each of which extends over 45°. In this case, the housing sections would each extend over 22.5°. There could also be four holes that each extend over 60°. In this case, the respective housing sections would extend over 30° of the circumference.

The size of the holes results in an adjustment range for the connecting means, such that the connecting means can be moved within an angular range. The ends of the holes, or slots, in the circumferential direction therefore form end stops or limits along the circumference.

The third harmonic gearing preferably has a third wave generator, which can be operated by at least a first sub-drive, wherein the third wave generator is located inside a third flex spline that is non-rotatably connected to the first housing, and the third flex spline has a third set of external teeth, and the fourth harmonic gearing preferably has a fourth wave generator that can be operated by a least a second sub-drive, wherein the fourth wave generator is located inside a fourth flex spline that is connected to the second housing for conjoint rotation, and the fourth flex spline has a fourth set of external teeth, and the second coupling element preferably forms a second circular spline, which has internal teeth that correspond to the first and third sets of external teeth, and the third coupling element preferably forms a third circular spline, which has internal teeth that correspond to the second and fourth sets of external teeth.

It should be noted here that the second and third circular splines can also be integral elements or made of multiple parts, and can each contain one or two sets of internal teeth.

The four wave generators can preferably be dedicated to two drive shafts or four drive shafts, i.e. connected thereto.

If there are two collective drive shafts, one locking element can be dedicated to each of the collective drive shafts. If there are four separate drive shafts, each drive shaft can have a separate dedicated locking element.

The two collective drive shafts are preferably hollow shafts through which supporting elements are inserted, which are then non-rotatably connected at one of their axial ends to the respective housing, wherein a first supporting element is located inside the first housing, and the third wave generator can rotate on this supporting element and the third flex spline is non-rotatably connected to this supporting element, wherein a second supporting element is located inside the second housing and the fourth wave generator can rotate on this supporting element and the fourth flex spline is non-rotatably connected to this supporting element.

The supporting element can be in the form of a tube. While one end of the supporting element is non-rotatably connected to the respective housing, the other end can be connected to a rotating and sealing element in the coupling element, wherein this element can preferably form a flange connected to the supporting element. In particular, there is no direct connection between the respective flange and the first and second housings, and instead, the connections are formed indirectly via the respective supporting elements.

With this embodiment, the coupling of the second circular spline to the third circular spline can be located inside the housing. This means that the circular spline on the first drive unit is coupled to the circular spline on the second drive unit inside the housing.

In other words, the circular splines no longer have to be connected by connecting means outside of the housings.

This has the advantage that there is no need for the connecting means, because there is a collective circular spline, the internal teeth of which correspond to the external teeth on the four flex splines. The second and third coupling elements, i.e. the second and third circular splines, can then form an integral component. It is also conceivable to connect the second and third circular splines for conjoint rotation.

There is also no need for the four aforementioned holes. There is also no need for the angular limitations, thus resulting in a larger adjustment range.

The invention is also obtained by a helicopter with the actuator described above.

Figure 1:
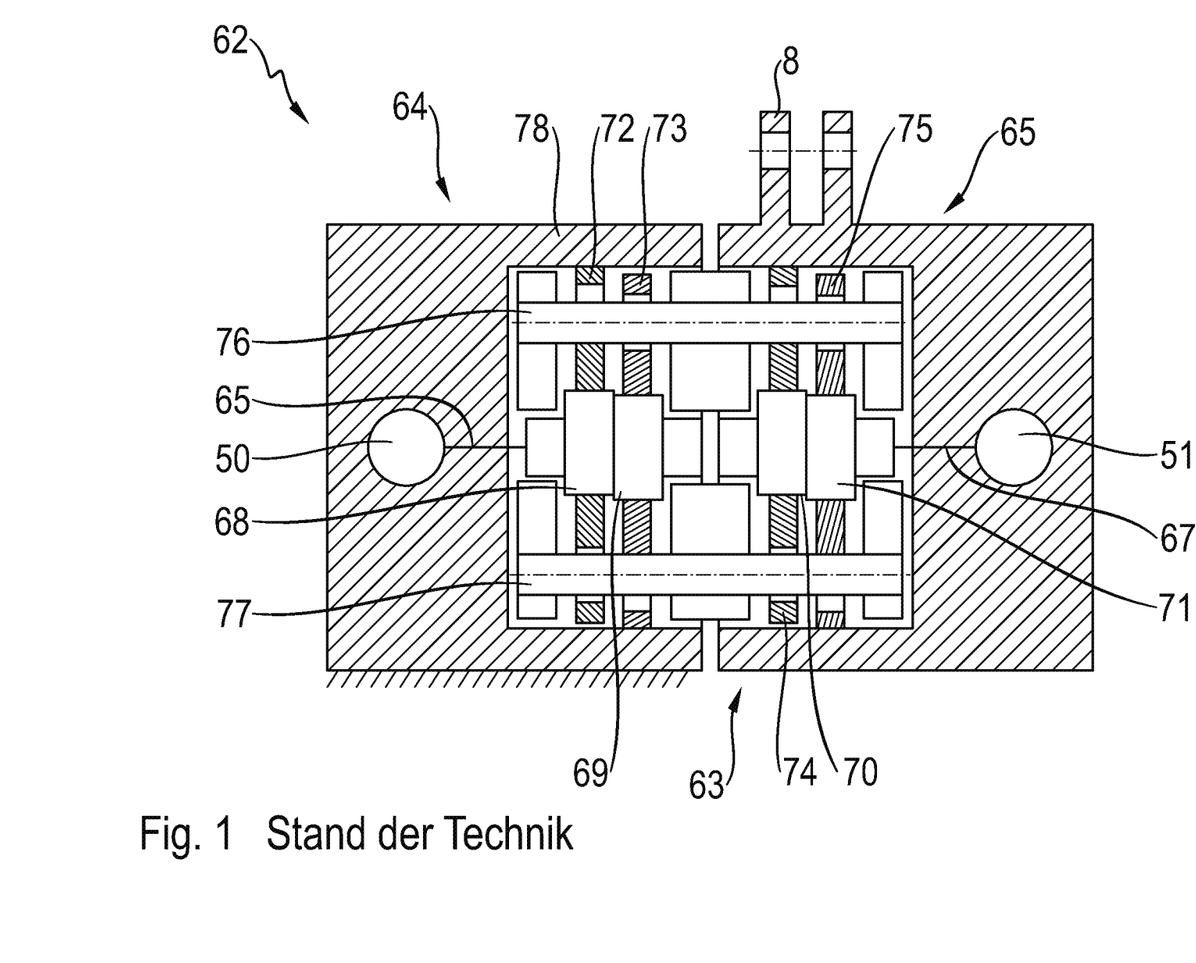
FIG. 1 shows a schematic illustration of an actuator according to the prior art.

A schematic illustration of an actuator according to the prior art (DE 10 2015 203 411 A1) can be seen in FIG. 1. This actuator is used in particular for adjusting rotor blades in a helicopter, and is part of a swashplate control or individual blade control for the main rotor blades or tail rotor blades on the helicopter.

The actuator 62 comprises two sub-drives 50 and 51, and is connected to an output drive 8 in the actuator 62 by a downstream transmission 63. The rotational movement generated by the drive assembly and translated by the transmission 63 can be transferred by the output drive 8 to components connected thereto.

The transmission 63 is in the form of a cycloidal drive, and is composed of two gear stages 64 and 65, via which input drive movements of the sub-drives 50 and 51 are combined to form the output drive 8. The transmission 63 has two input shafts 66 and 67 for this, of which the input shaft 66 is connected to the sub-drive 50, and the input shaft 67 is connected to the sub-drive 51. Each of the input shafts 66 and 67 have a total of two eccentric eccentrics 68 and 69 or 70 and 71, respectively, each of which is connected to and drives a cam plate 72, 73, 74, or 75, respectively. All of the cam plates 72 to 75 are connected to the same pins 76 and 77, wherein the cam plates 72 and 73 are in radial contact with a stationary ring gear, while one of the ring gears on the cam plates 74 and 75 is connected to the output drive 8 for conjoint rotation. With this transmission structure 63, even if one of the two transmission stages 64 or 65 is blocked, at least a limited control function can be obtained via the other transmission stage 65 or 64, respectively.

Figure 2:
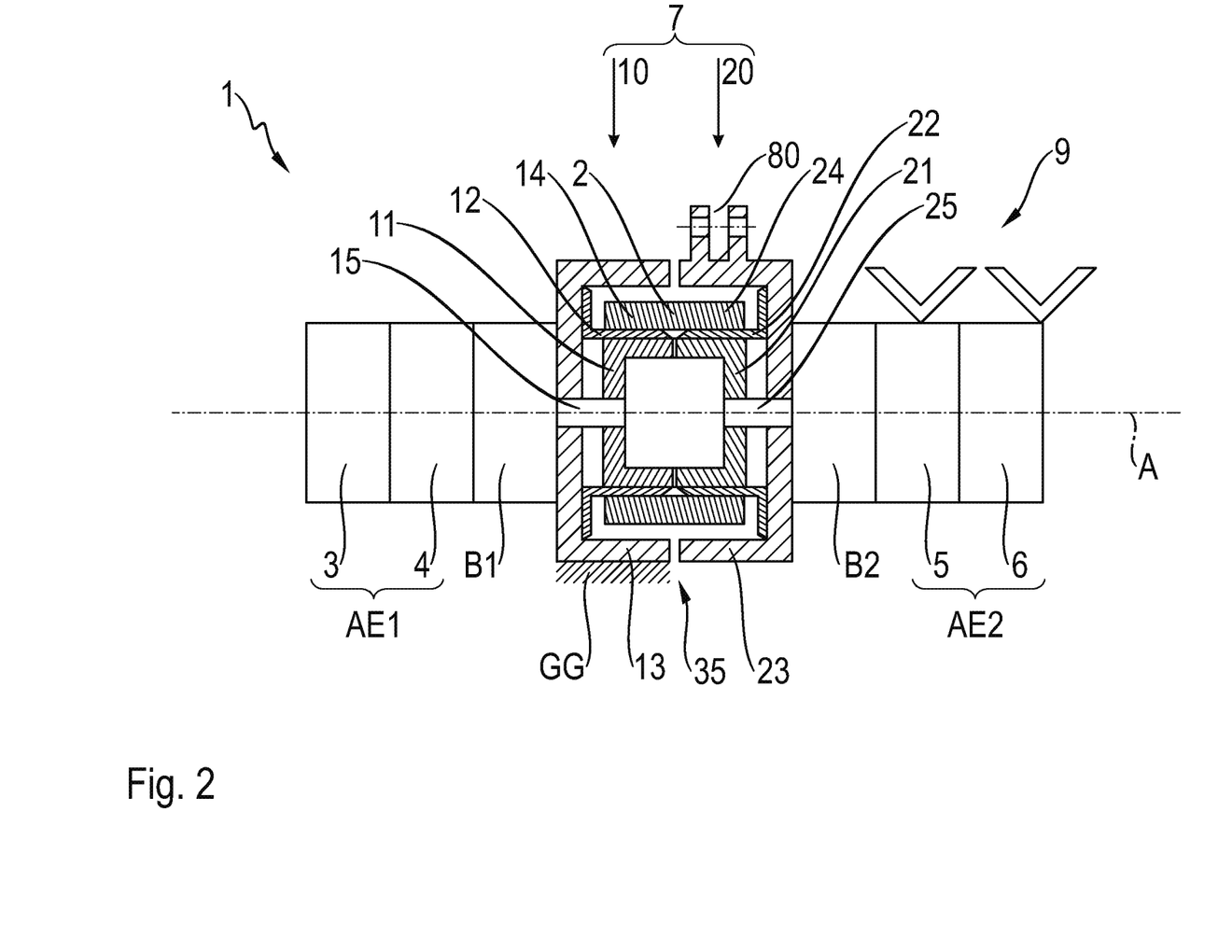
FIG. 2 shows a schematic illustration of an actuator according to a first design of the invention.

FIG. 2 shows a schematic illustration of an actuator 1 according to a first embodiment of the invention. This actuator 1 is intended in particular for adjusting rotor blades in a helicopter, and is part of a swashplate control or a control for individual blades on the main or tail rotors of the helicopter. The actuator 1 can also be used elsewhere in the helicopter, or in other aircraft such as airplanes for various control functions, such as that for flaps or a rudder, e.g. in the form of an elevator or aileron.

As can be seen in FIG. 2, the actuator comprises an electromechanical drive assembly, which is formed by numerous sub-drives 3, 4, 5, and 6, and is connected to the output drive 80 for the actuator 1 by a transmission between the sub-drives 3, 4 on one side and the sub-drives 5, 6 on the other side. According to this embodiment, there are to sub-drives for each side for redundancy purposes, resulting in a total of four sub-drives. The sub-drives 3, 4 form a first drive unit AE1. The other sub-drives 5, 6 form a second drive unit AE2. The invention also functions with just two sub-drives, i.e. just one sub-drive on each side. The output drive 80 is in the form of a yoke in the present case, via which the rotational movement thereof, generated by the drive units AE1, AE2 and translated via the transmission 7, is transferred to the components connected thereto. It can be readily seen that the at least one sub-drive 3, 4 is spatially separated from the at least one other sub-drive 5, 6 in that the transmission 7 is located therebetween, such that at least two sub-drives are separated from one another by the transmission 7.

The four sub-drives 3 to 6 in the drive assembly can be operated independently in the present case, in order to obtain a redundant system with the actuator 1. As such, each of the sub-drives 3 to 6 is supplied with power by a dedicated power line (not shown). The sub-drives 3 and 4 can be hard-wired, in particular. The sub-drives 5 and 6 can be supplied with electricity via sliding contacts 9. It is also conceivable, and may also be advantageous in some embodiments, for the sub-drives 5, 6 to also be hard-wired.

The transmission 7 has two drive shafts, with the at least one sub-drive 3, 4 on the one side of the transmission 7 dedicated to the first drive shaft 15, and the at least one sub-drive 5, 6 on the other side of the transmission 7 dedicated to the second drive shaft 25. The transmission 7 can therefore combine the drive powers of the sub-drives 3 and/or 4 and 5 and/or 6 for the output drive 80.

At this point, there is no need to explain the various aspects of the control and regulation in greater detail. This has already been explained in the description of FIG. 1 in DE 10 2015 203 411 A1, by way of example.

The transmission 7 has two strain wave gearings, also referred to as harmonic gearings.

A first harmonic gearing 10 comprises three elements, in the known manner, specifically a first wave generator 11, a first flex spline 12, and a first circular spline 14. The first wave generator 11 is an elliptical steel disk, which forms the input drive for the transmission 10. The first flex spline 12 is a flexible cylindrical steel cup with a first set of external teeth. The circular spline 14 is a rigid cylindrical outer ring with internal teeth that correspond to the first set of external teeth. The first wave generator 11 is connected to a first drive shaft 15, wherein the first drive shaft 15 can be driven by the sub-drives 3 and 4. The first flex spline 12 is located inside the first transmission housing 13 and is non-rotatably connected to this housing 13. The housing 13 is stationary, e.g. located on a housing GG or some other non-rotating component.

A second harmonic gearing 20 comprises a second wave generator 21, a second flex spline 22, and a second circular spline 24. The second wave generator 21 is an elliptical steel disk that forms the input drive for the transmission 20. The second flex spline 22 is a flexible steel cup that has a second set of external teeth. The circular spline 24 is a rigid cylindrical outer ring with internal teeth that correspond to the second set of external teeth. The second wave generator 21 is connected to a second drive shaft 25, wherein the second drive shaft 25 can be driven by the sub-drives 5 and 6. The second flexible spline 22 is located inside a second transmission housing 23 and connected to this housing 23. Unlike the first housing 13, this housing 23 can rotate about an input drive axis A. The second housing 23 is connected to the output drive 80, or forms this output drive 80.

The two circular splines 14, 24 form an integral component with internal teeth. This integral component forms a coupling means 2 that couples the two harmonic gearings 10, 20 to one another. The coupling means 2 can also be referred to as a first shared circular spline. This coupling means 2 forms the output drive for the first drive unit AE1 and the non-rotating support for the second drive unit AE2.

The coupling element forms an integral circular spline 2 in the present case. The circular spline 2 can also be formed by multiple parts, e.g. two outer rings 14, 24 that are connected to one another.

The wave generator 11 drives the circular spline 2, while the second drive unit AE2 is braced against the circular spline 2. The output drive is then obtained via the flex spline 22.

A gap 35 can be seen in FIG. 2 between the first housing 13 and the second housing 23. This gap 35 simply indicates that the two housings are not connected for conjoint rotation, and that instead, the two housings can move in relation to one another, which is necessary for the adjustment function. Therefore, there is preferably a sealing component in the gap 35, thus ensuring that the two housings are sealed against the exterior. A shaft seal, in particular in the form of a radial shaft seal, can be used as the sealing component, in order to seal the housing 13, 23 against the environment.

A combined input drive movement formed by the sub-drives 3 to 6 is translated incrementally into the output drive 80 via the transmission 7.

The sub-drives 3 to 6 are each formed by three-phase electric motors. In addition, the sub-drives 3 and 4, and 5 and 6 lying on their respective sides of the transmission are arranged successively in the axial direction with respect to the drive shafts 15 and 25, and contained in the same respective housings. The sub-drives 3, 4 form the first drive unit AE1. Sub-drives 5, 6 form the second drive unit AE2.

There is also a first locking element B1 between the first drive unit AE1 and the harmonic gearing 10, and a second locking element B2 between the second drive unit AE2 and the harmonic gearing 20. The locking elements B1, B2 each form electromagnetic brakes, which stop the corresponding shafts when the electrical current supply is interrupted, thus forming "power off brakes." The locking elements B1, B2 are at the input drive side in this embodiment, and can keep the first and second drive shafts 15, 25 stationary with respect to the housings 13 and 23, respectively, when the electrical current supply is interrupted, thus preventing rotation of the drive shafts 15 and 25.

Figure 3:
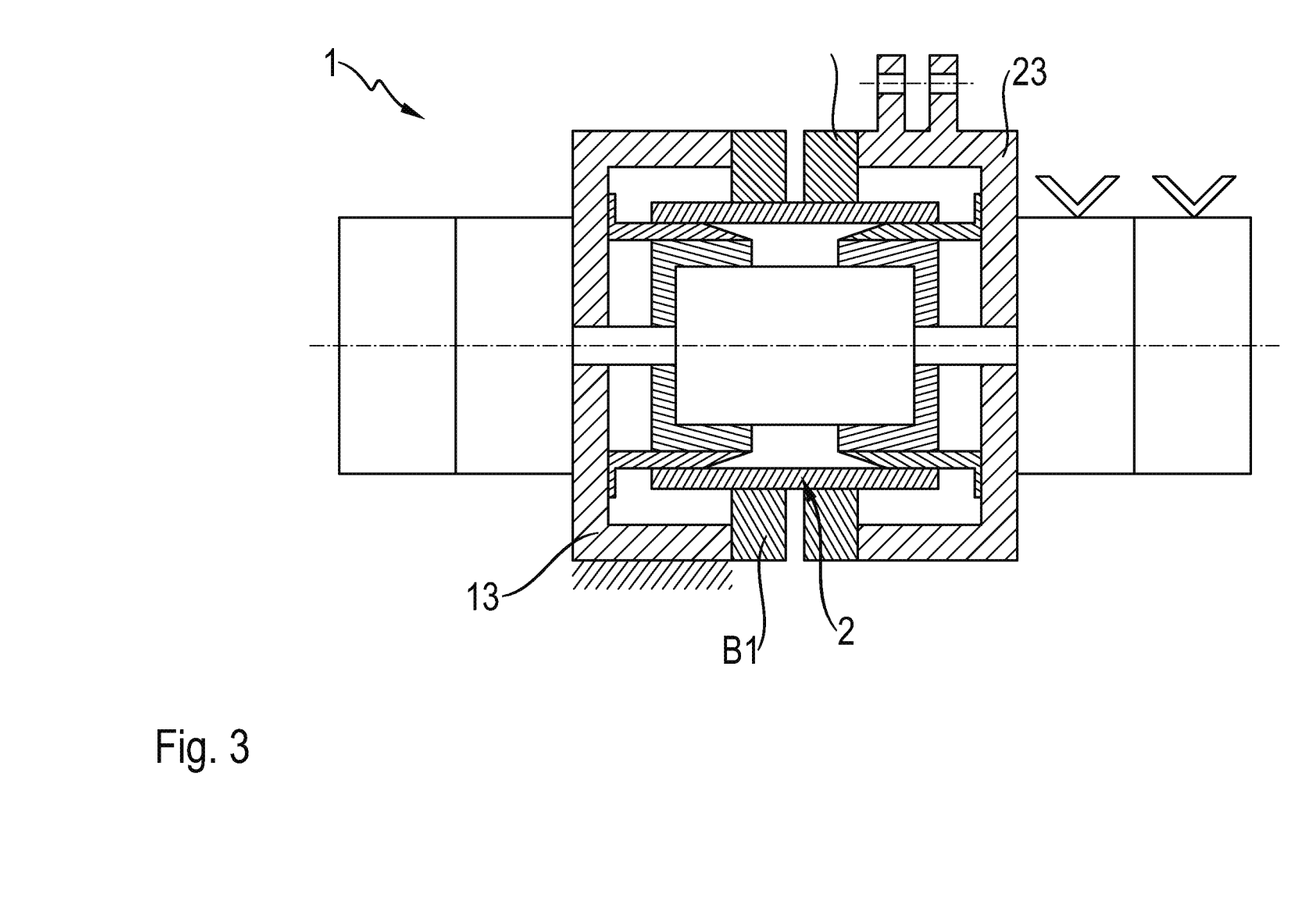
FIG. 3 shows a schematic illustration of an actuator according to a second design of the invention.

FIG. 3 shows a schematic illustration of an actuator 1 corresponding to a second possible embodiment of the invention. The actuator 1 substantially corresponds in this case to the embodiment shown in FIG. 2, but the locking elements are not at the input drive side, and instead are located at the output drive side. There is therefore a first locking element B1 that is configured to prevent relative movement between the stationary first housing 13 and the shared circular spline 2. The second locking element B2 is designed to prevent relative movement between the moving second housing 23 and the shared circular spline 2.

If the first locking element B1 is activated at the output drive side, output drive movement of the first drive unit AE1 via the shared circular spline 2 is prevented, and the output drive movement of the actuator 1 is generated exclusively via the input drive movement of the second drive unit AE2.

If the second locking element B2 is activated at the output drive, relative movement between the second housing 23 and the shared circular spline 2 is prevented, and the output drive movement of the actuator 1 is generated exclusively via the input drive movement of the first drive unit AE1. The first drive unit AE1 then moves the entire second drive unit AE2, including the output drive 80 of the actuator 1, via the rotation of the shared circular spline 2.

For everything else, reference is made to the explanations regarding FIG. 2.

Figure 4:
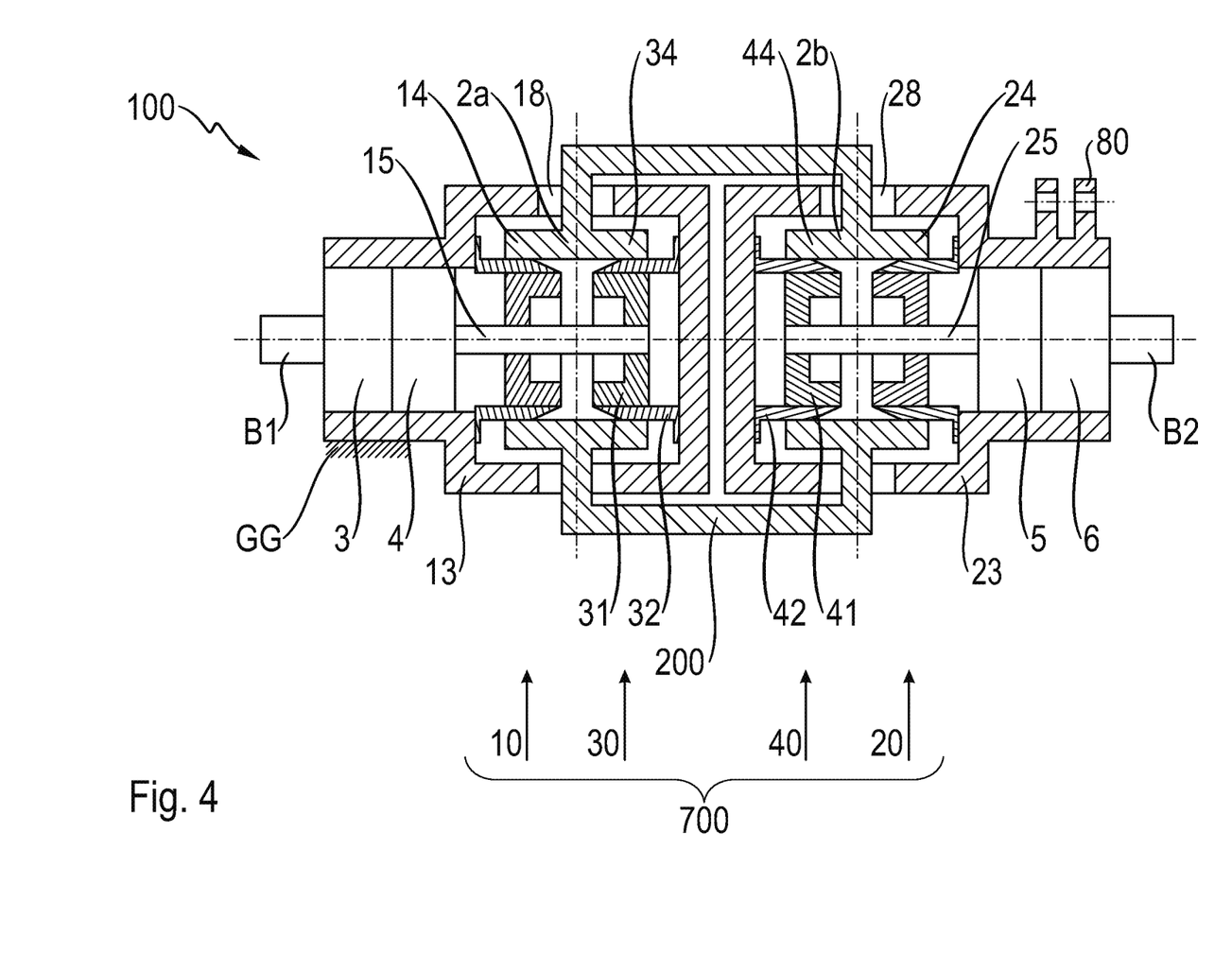
FIG. 4 shows a schematic illustration of an actuator corresponding to a third embodiment of the invention.

FIG. 4 shows a schematic illustration of part of an actuator 100 corresponding to a third embodiment of the invention. Based on the embodiment shown in FIG. 2, the embodiment in FIG. 4 contains a transmission 700 characterized by two additional harmonic gearings. This further increases the redundancy of the actuator.

The actuator 100 therefore contains a third harmonic gearing 30 and fourth harmonic gearing 40, which are placed axially between the first harmonic gearing 10 and second harmonic gearing 20. The first and third harmonic gearings 10, 30 are inside the stationary first housing 13. The second and fourth harmonic gearings 20, 40 are inside the rotating second housing 23.

The third harmonic gearing 30 comprises a third wave generator 31, third flex spline 32, and third circular spline 34. The third wave generator 31 is an elliptical steel disk that forms the input drive for the transmission 30. The third flex spline 32 is a flexible cylindrical steel cup that has a third set of external teeth. The third circular spline 34 is a rigid cylindrical outer ring that has internal teeth corresponding to the third set of external teeth. The third wave generator 31, like the first wave generator 11 in the first harmonic gearing 20, is also connected to the first drive shaft 15, wherein the first drive shaft 15 can be driven by the sub-drives 3 and 4. The third flex spline 32 is located inside the first transmission housing 13 and non-rotatably connected to this housing 13.

Instead of the coupling element 2, this embodiment has a different coupling element 2a, which couples the first and third harmonic gearings 10, 30 to one another. The coupling element 2a therefore forms a shared outer ring with internal teeth, wherein the internal teeth on the outer ring 2a correspond to the first set of external teeth on the first flex spline 12 in the harmonic gearing 10 and to the third set of external teeth on the third flex spline 32 in the harmonic gearing 30. The coupling means 2a can also be referred to as a second shared circular spline.

The fourth harmonic gearing 40 comprises a fourth wave generator 41, fourth flex spline 42, and fourth circular spline 44. The fourth wave generator 41 is an elliptical steel disk, which forms the input drive for the transmission 40. The fourth flex spline 42 is a flexible cylindrical steel cup with a fourth set of external teeth. The fourth circular spline 44 is a rigid cylindrical outer ring with internal teeth that correspond to the fourth set of external teeth. Like the second wave generator 21 in the second harmonic gearing 20, the fourth wave generator 41 is also connected to the second drive shaft 25, wherein the second drive shaft 25 can still be driven by the sub-drives 5 and 6. The fourth flex spline 42 is located inside the rotating second transmission housing 23 and connected to this housing 23.

The second and fourth harmonic gearings 20, 40 are coupled to one another by a coupling element 2b. The coupling element 2b therefore forms a shared outer ring with internal teeth, wherein the internal teeth on the outer ring 2b correspond to the second set of external teeth on the second flex spline 22 in the second harmonic gearing 20 and to the fourth set of external teeth on the fourth flex spline 42 in the fourth harmonic gearing 40. The coupling means 2b can also be referred to as a third shared circular spline.

The first and second housing 13, 23 each have numerous holes along their circumference. The first housing 13 has numerous first holes 18, which in this case are slots extending along the circumference. The second housing 23 has numerous second holes 28, which are also in the form of slots extending along the circumference. Connecting elements 200 are inserted in the holes 18, 28 to connect the second and third shared circular splines 2a, 2b for conjoint rotation. The connecting elements 200 are formed by webs, which can also be referred to colloquially as coupling arms.

The connecting elements 200 are at least partially outside of the housings 13, 23. According to this embodiment, there are six slots 18, 28 in each case, by way of example, which extend along the circumference over an angle of approx. 40°. Such an angular extension results in a sufficient adjustment range while maintaining sufficient stiffness or structural stability.

The third harmonic gearing 30 has a third wave generator 31, which can be driven by at least one first sub-drive 3, 4, and the third wave generator 31 is located inside a third flex spline 32 that is non-rotatably connected to the first housing 13, wherein the third flex spline 32 has a third set of external teeth.

The fourth harmonic gearing has a fourth wave generator 41 that can be driven by at least one second sub-drive 5, 6, wherein the fourth wave generator 41 is located inside a fourth flex spline 42 that is connected to the second housing 23 for conjoint rotation, wherein the fourth flex spline 42 has a fourth set of external teeth.

The second coupling element 14 forms a second circular spline, which has internal teeth that correspond to the first and third sets of external teeth. The third coupling element 24 forms a third circular spline that has internal teeth corresponding to the second and fourth sets of external teeth.

The sub-drives 3, 4 are still dedicated to the same first drive shaft 15, and the sub-drives 5, 6 are dedicated to the second drive shaft 25. The locking units B1, B2 are at the input drive side, but on a sides of the sub-drives 3, 4, and 5, 6 facing away from the transmission 700.

The sub-drives 3 to 6 are preferably hard-wired to the electrical source. The holes 18, 28 limit the angular movement. In this case, a hard-wired electrical supply can be used, which is less susceptible to wear than a slip ring system.

The embodiment in FIG. 4 has advantages over the embodiments in FIGS. 2 and 3 in that there are now four flex splines. The flex spline is subject to greater loads. It is therefore susceptible to breakage or fracturing caused by overloads or material fatigue. If the flex spline breaks the drive unit will spin freely if there is no redundant load path.

As a result of the additional harmonic gearings 30, 40, there is a second load path. This shall be explained in reference to FIG. 5 in greater detail.

Figure 5:
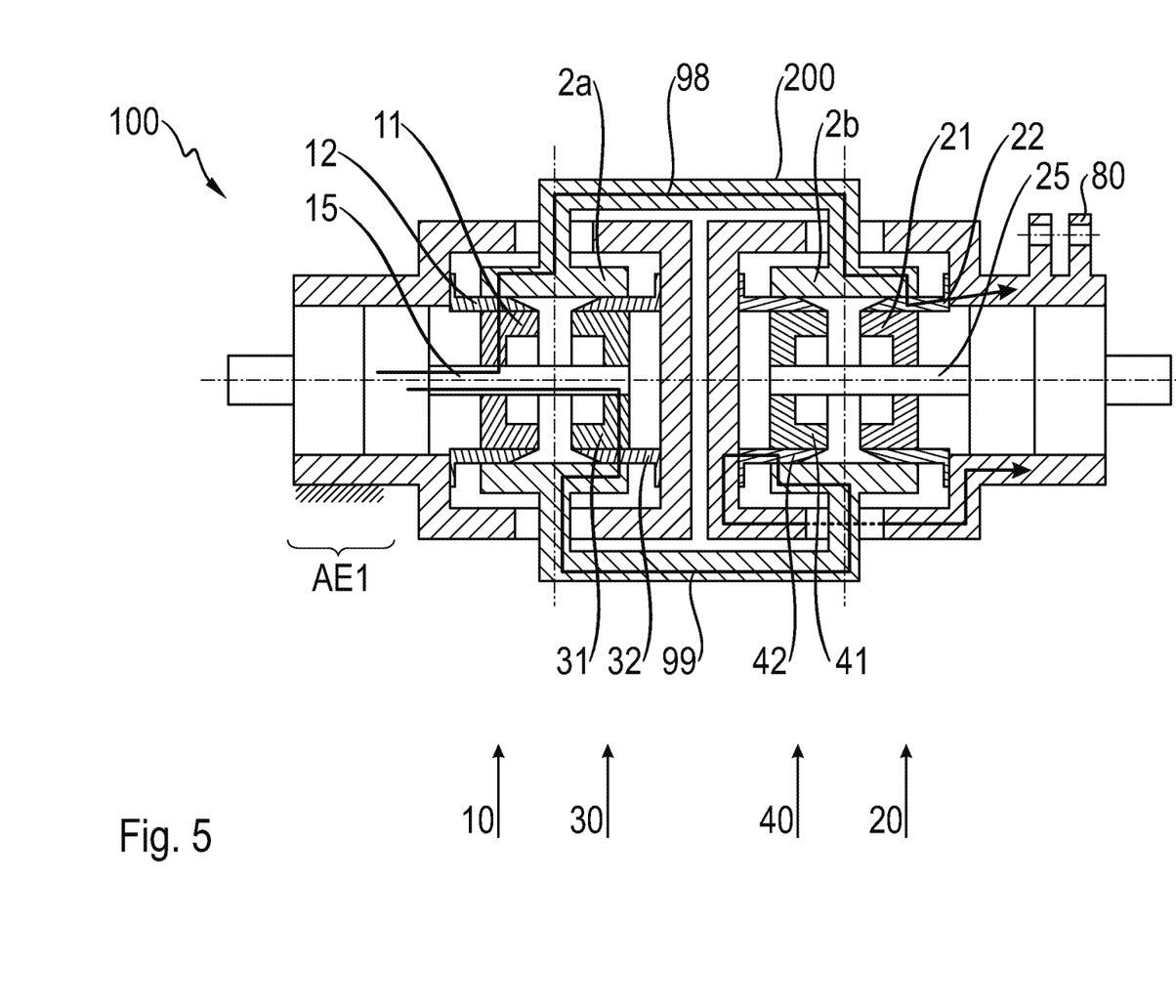
FIG. 5 shows a schematic illustration of two load paths for the actuator in FIG. 4.

FIG. 5 shows the same actuator 100 shown in FIG. 4. Starting at the first drive unit AE1, two of the many possible load paths 98, 99 are shown.

The torque flow in the first load path 98 starts at the drive unit AE1 and passes through the drive shaft 15, the first wave generator 11, the first flex spline 12, the circular spline 2*a*, and arrives at the circular spline 2*b* via the connecting element 200, finally reaching the output drive 80 via the second flex spline 22.

The torque flow in the second load path 99 starts at the first drive unit AE1 and passes through the input shaft 15, the third wave generator 31, the third flex spline 32, the circular spline 2*a*, and arrives at the circular spline 2*b* via the connecting element 200, finally reaching the output drive via the fourth flex spline 42.

For the second drive unit AE2 there are also two flow paths from the drive shaft 25 to the housing 23, and thus the output drive 80, via the wave generator 41 and the flex spline 42, or via the wave generator 21 and the flex spline 22.

If the third flex spline 32 should fail, for example, due to breakage or fracturing, the second load path would be interrupted, and it would no longer be possible to transfer any drive power by this means. The drive power could advantageously be transferred in this case, however, via the remaining first load path.

Figure 6:
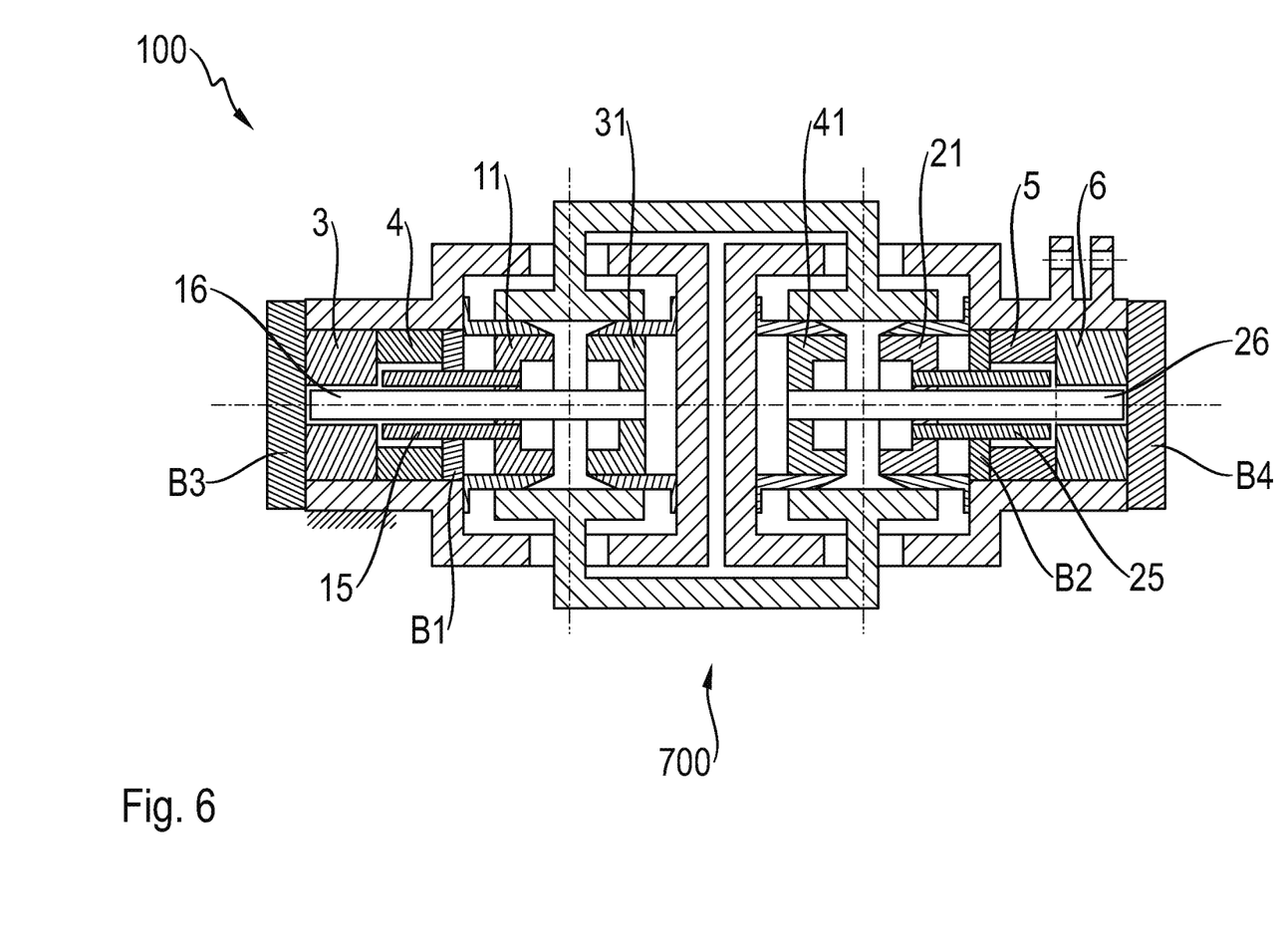
FIG. 6 shows a schematic illustration of an actuator according to a fourth design of the invention.

FIG. 6 shows a schematic illustration of an actuator 100 corresponding to another possible embodiment of the invention. The actuator 100 substantially corresponds to the embodiment in FIG. 4, but the sub-drives 3, 4 and 5, 6 are not on the same first and second drive shafts 15, 25, respectively, and instead are located on separate drive shafts.

The first drive shaft 15 is formed by a hollow shaft and is coaxial to a second drive shaft 16. The first drive shaft 15 has a dedicated second sub-drive 4. The first drive shaft 15 is connected to the first wave generator 11. The first sub-drive 3 is then dedicated to the third drive shaft 16. The third drive shaft 16 is connected to the third wave generator 31.

The second drive shaft 25 is formed by a hollow shaft and is coaxial to a second drive shaft 26. The third sub-drive 5 is dedicated to the second drive shaft 25, which is connected to the second wave generator 21. The fourth sub-drive 6 is dedicated to the fourth drive shaft 26, which is connected to the fourth wave generator 41.

Furthermore, each of the drive shafts 15, 16, 25, 26 has a separate dedicated locking element. The first drive shaft 15 therefore has a first dedicated locking element B1, the second drive shaft 25 has a second dedicated locking element B2, the third drive shaft 16 has a third dedicated locking element B3, and the fourth drive shaft 26 has a fourth dedicated locking element B4. The first and second locking elements B1, B2 are each located axially between their dedicated sub-drives 4, 5 and the wave generators 11, 21 driven by these sub-drives. The third and fourth locking elements B3, B4 are each located on a side of the corresponding sub-drive 3, 6 facing away from the transmission 700. Everything else has been explained in reference to FIG. 4.

The actuator 100 according to the invention illustrated in FIG. 6 also enables a reliable stopping in the following malfunction scenario: the sub-drive 3 can no longer be controlled and drives the drive shaft 16 in an uncontrolled manner (so-called "power runaway"). The sub-drive 4 can compensate for the uncontrolled sub-drive 3 in this case in the best-case scenario. The locking element B3 is controlled or regulated by the same regulating unit as the sub-drive 3, and is therefore also impossible to control or regulate. Accordingly, the locking element B1 must be used to lock the sub-actuator shown on the left in FIG. 6, because a locking function by means of the sub-drive 4 can no longer be reliably ensured, and the locking by means of the locking element B1 is also more efficient.

Figure 7:
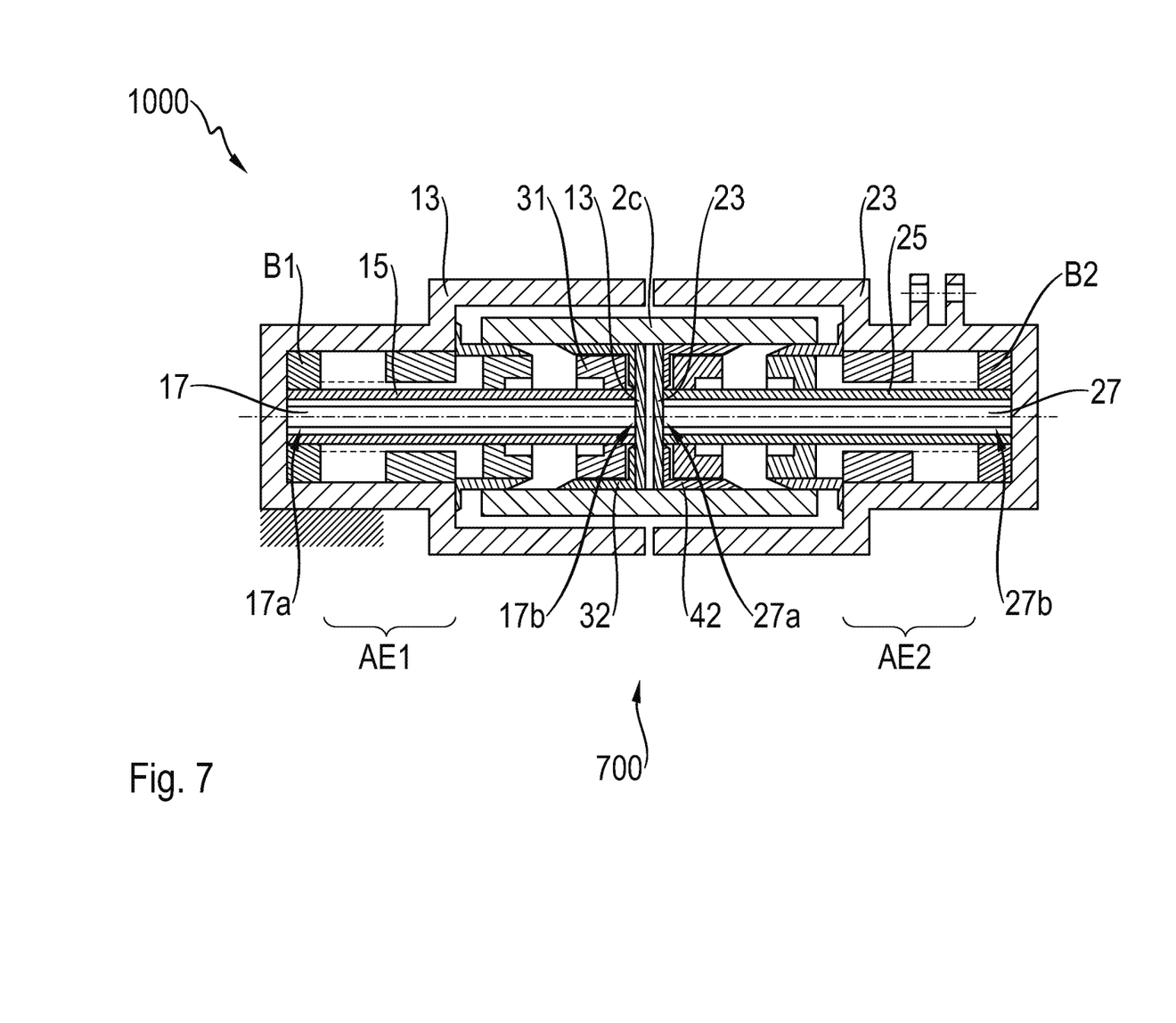
FIG. 7 shows a schematic illustration of an actuator according to a fifth design of the invention.

FIG. 7 shows a schematic illustration of an actuator 1000 in another possible embodiment of the invention. The actuator 1000 substantially corresponds to the embodiment shown in FIG. 4, with the difference that the two combined drive shafts 15, 25 are each hollow, and a supporting element 17, 27 is inserted through them. The supporting elements are each non-rotatably connected at one end 17*a*, 27*b* to the respective housing 13, 23. The other ends 17*b*, 27*b* of the supporting elements 17, 27 are connected to a sealing flange in the coupling element 2*c* that rotates and is not directly connected to the respective housing 13, 23.

A first supporting element 17 in the form of a tube is located inside the first housing 13, and the third wave generator 31 is rotatably supported on this supporting element 17 and connected to the first drive shaft 15, and the third flex spline is non-rotatably connected to this supporting element. A second supporting element 27, also in the form of a tube, is located inside the second housing 23, and the fourth wave generator 41 is rotatably supported on this supporting element 27 and connected to the second drive shaft 25, and the fourth flex spline is non-rotatably connected to this supporting element.

It can be clearly seen how the one end 17*a* of the first supporting element 17 is attached to the first housing 13, while the other end 17*b* is connected to flange, which is not directly connected to the housing 13. It can also be clearly seen how the one end 27*b* of the second supporting element is attached to the second housing 23, while the other end 27*a* is attached to the flange, which is not directly connected to the housing 23. The non-rotatable support of the flex splines 32, 42 is obtained via the supporting tubes 17 and 26 that pass through the respective drive shafts 15, 25.

The two locking elements B1, B2 are each coaxial to the supporting elements 17, 27. The drive units are located axially between the locking elements B1, B2 and the transmission.

Unlike the embodiment in FIG. 4, this embodiment enables a coupling of the second circular spline 2*a* to the third circular spline 2*b* inside the housings 13, 23. The connecting means 200 is thus replaced by a circular spline 2*c*, the internal teeth of which correspond to the external teeth on the four flex splines 12, 22, 32, 42. It has proven to be the case that it is easier to obtain the connecting means 200 from a structural perspective than to the connect the individual circular splines.

The second and third coupling elements, i.e. the second and third circular splines 2*a*, 2*b* are thus formed by an integral component 2c. It is also conceivable to connect the second and third circular splines 2a, 2b for conjoint rotation.

In other words, the circular splines 2a, 2b no longer need to be connected by a connecting means 200 outside the housing. This means that there is no longer any need for the holes 18, 28, such that there is no longer any angular limitation, thus resulting in a larger adjustment range. It is preferred in the embodiment shown in FIG. 7, in which the components rotating in relation to one another can rotate over a larger angular range, that the sub-drives 5, 6 are supplied with electricity without wires, but instead via slip rings.

The susceptibility to damage of the actuator designed according to the invention is reduced, such that its reliability is increased.

Information Regarding FIGS. 2 to 7:

The embodiments shown in FIGS. 2 to 7 have locking elements B1 to B4. It should be noted that each of these embodiments can have short circuiting means instead of the locking elements. The exception is in the embodiment in FIG. 3, where the "short circuiting method" cannot be used because the braking effect would take place at the input drive side.

A braking effect can be obtained without a locking element by the braking of an drive unit itself. This shall be explained in greater detail below:

If one of the sub-drives 3, 4, 5, 6 malfunctions, a braking effect can be obtained by short circuiting the motor phases of the faulty sub-drive 3, 4, 5, 6. As a result of the short circuit, a phase current is generated due to the voltage induced by the rotation of the drive shaft that results in an electromagnetic braking torque acting on the drive shaft in the sub-drive. There should therefore be numerous means that are configured to generate a short circuit in the motor phases in each of the sub-drives. This braking effect through the short circuiting of the motor phases can be obtained with an actuator that has two sub-drives 3, 4 (FIG. 2) as well as an actuator that has four sub-drives 3, 4, 5, 6 (FIGS. 4, 5, 6, 7).

It is possible to obtain a braking effect in an actuator with four sub-drives 3, 4, 5, 6, as shown in FIGS. 4, 5, 6, 7, without locking elements and without short circuiting the motor phases. In this case, if a sub-drive malfunctions, the functioning sub-drive in the same drive unit AE1, AE2 is configured, i.e. it is controlled, such that the output drive movement of the malfunctioning drive unit AE1, AE2 is "actively" braked. In other words, the malfunctioning drive unit AE1, AE2 is braked by the remaining sub-drive itself. A regulating algorithm is implemented for this. There is no need for additional hardware.

In an actuator that has four sub-drives 3, 4, 5, 6, the "short circuit method" can be combined with the method for "active" braking of the drive unit. This means that the malfunctioning sub-drive is short circuited while the functioning sub-drive in the same drive unit brakes the drive unit.

Figure 8:
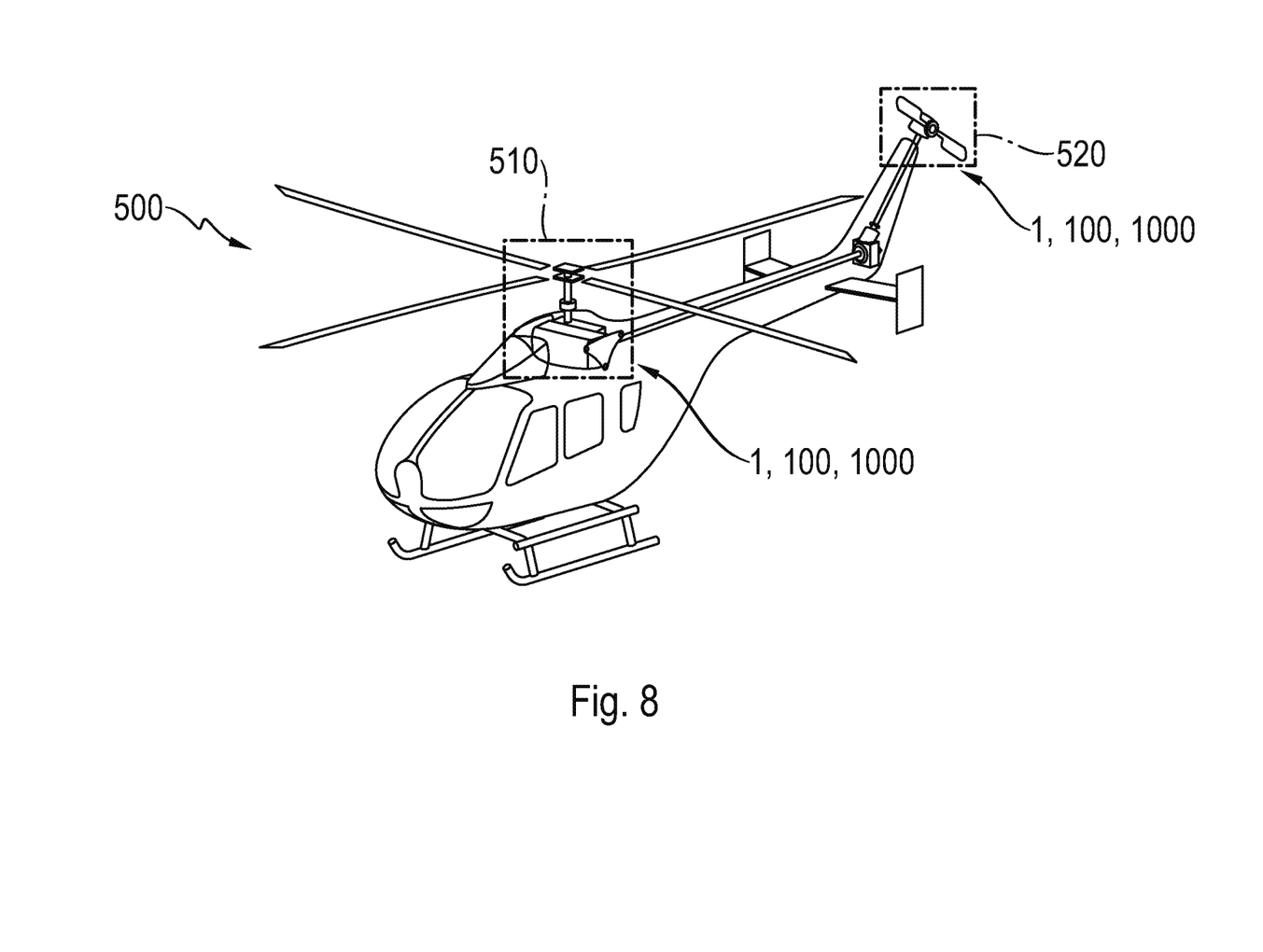
FIG. 8 shows a helicopter with an actuator.

FIG. 8 shows a helicopter 500 that has numerous actuators 1, 100, 1000. The actuators can form part of a primary control 510 for the swashplate and for individual blades. The actuators can also be part of a control for individual blades or a collective control 520 for the tail rotor.

REFERENCE SYMBOLS

Prior Art
50 sub-drive
51 sub-drive
62 actuator
63 transmission
64 gear stage
65 gear stage
66 drive shaft
67 drive shaft
68 eccentric
69 eccentric
70 eccentric
71 eccentric
72 cam plate
73 cam plate
74 cam plate
75 cam plate
76 pin
77 pin
78 ring gear
63 transmission
Invention
1 actuator
100 actuator
1000 actuator
2 coupling means, circular spline
2a coupling means, circular spline
2b coupling means, circular spline
2c coupling means, circular spline
3 sub-drive
4 sub-drive
5 sub-drive
6 sub-drive
7, 700 transmission
9 electrical power supply, hard-wired, wireless, slip ring
10 harmonic gearing, strain wave gearing
11 wave generator
12 flex spline
13 housing
14 circular spline
15 drive shaft
17 supporting element
17a axial end
17b axial end
18 hole(s)
20 harmonic gearing, strain wave gearing
21 wave generator
22 flex spline
23 housing
24 circular spline
25 drive shaft
27 supporting element
27a axial end
27b axial end
28 hole(s)
30 harmonic gearing, strain wave gearing
31 wave generator
32 flex spline
34 circular spline
40 harmonic gearing, strain wave gearing
41 wave generator
42 flex spline
44 circular spline
98 load path
99 load path
80 output drive
200 connecting element
500 helicopter
510 main rotor
520 tail rotor
A axis AE1 drive unit
AE2 drive unit
B1 locking element, brake
B2 locking element, brake
B3 locking element, brake
B4 locking element, brake
GG transmission housing

The invention claimed is:

1. An actuator for adjusting rotor blades in a helicopter, the actuator comprising:
an electromechanical drive assembly connected to an output drive via a downstream transmission, wherein the drive assembly is divided into sub-drives that can be operated independently, wherein at least two sub-drives are spatially separated from one another in that the transmission is located between the at least two sub-drives, wherein the transmission comprises at least two harmonic gearings coupled to one another by at least one coupling element, wherein a first harmonic gearing is located inside a non-rotating first housing, wherein a second harmonic gearing is located inside a rotating second housing, wherein the second housing is connected to the output drive, wherein the actuator also comprises a third harmonic gearing and a fourth harmonic gearing, which are located axially between the first and second harmonic gearings, wherein the at least one coupling element comprises a first coupling element and a second coupling element, the first coupling element couples the first and third harmonic gearings, and the second coupling element couples the second and fourth harmonic gearings, and wherein the first and second coupling elements are connected to one another for conjoint rotation.

2. The actuator according to claim 1,
wherein the transmission has at least two drive shafts, wherein the at least one sub-drive on the one side of the transmission is dedicated to the one drive shaft, and the at least one sub-drive on the other side of the transmission is dedicated to the other drive shaft, and
wherein the transmission combines the drive powers of the sub-drives to form the output drive.

3. The actuator according to claim 1, wherein
the first harmonic gearing has a first wave generator that can be driven by at least one first sub-drive, wherein the first wave generator is located inside a first flex spline that is non-rotatably connected to the first transmission housing, wherein the first flex spline has a first set of external teeth, and
the second harmonic gearing has a second wave generator that can be driven by at least one second sub-drive, wherein the second wave generator is located inside a second flex spline that is connected to the second housing for conjoint rotation, wherein the second flex spline has a second set of external teeth, and
the at least one coupling element forms an integral circular spline or a multi-part circular spline, and wherein the circular spline contains one or more sets of internal teeth, which correspond to the first and second sets of external teeth.

4. The actuator according to claim 1, wherein there are two sub-drives on each side of the transmission.

5. The actuator according to claim 1, wherein there is at least one locking element on each side of the transmission, which is located at the input drive side and is configured to stop at least one sub-drive.

6. The actuator according to claim 1, wherein there is at least one locking element on each side of the transmission, which is at the output drive side and is configured to prevent relative movement between one of the two housings and the coupling element in each case.

7. The actuator according to claim 1, wherein there are four sub-drives, wherein two of the four sub-drives are dedicated to the same drive shaft in each case.

8. The actuator according to claim 1, wherein there are four sub-drives, and each of the four sub-drives is dedicated to a separate drive shaft.

9. The actuator according to claim 1,
wherein the first and third harmonic gearings are located inside the non-rotating first housing,
wherein the second and fourth harmonic gearings are located inside the rotating second housing, and
wherein the first and second housing have numerous holes along their respective circumferences, in particular slots extending along the circumference, through which connecting elements are inserted to obtain a connection between the first and second coupling elements for conjoint rotation, such that the connecting elements are at least partially located outside the housing.

10. The actuator according to claim 1, wherein the third harmonic gearing has a third wave generator, which can be operated by means of at least one first sub-drive, wherein the third wave generator is located inside a third flex spline that is non-rotatably connected to the first housing, wherein the third flex spline has a third set of external teeth, the fourth harmonic gearing has a fourth wave generator that can be operated by means of at least one second sub-drive, wherein the fourth wave generator is located inside a fourth flex spline that is connected to the second housing for conjoint rotation, wherein the fourth flex spline has a fourth set of external teeth, the first coupling element forms a second circular spline, wherein the second circular spline has internal teeth that correspond to the first and third sets of external teeth, and the second coupling element forms a third circular spline, wherein the third circular spline has internal teeth that correspond to the second and fourth sets of external teeth.

11. The actuator according to claim 8, wherein two wave generators are located on the same drive shaft in each case.

12. The actuator according to claim 8, wherein the wave generators are each located on separate drive shafts.

13. The actuator according to claim 8, wherein
the two drive shafts are each formed by hollow shafts, through which a supporting element is inserted that is non-rotatably connected at one of its ends to the respective housing,
wherein the first supporting element is located inside the first housing and the third wave generator is rotatably supported on this supporting element, and the third flex spline is non-rotatably connected to this supporting element, and
wherein a second supporting element is located inside the second housing and the fourth wave generator is rotatably supported on this supporting element and the fourth flex spline is non-rotatably connected to this supporting element.

14. A helicopter that has one or more actuators according to claim 1.

15. An actuator for adjusting rotor blades in a helicopter, the actuator comprising:
an electromechanical drive assembly connected to an output drive via a downstream transmission,
wherein the drive assembly is divided into sub-drives that can be operated independently, wherein at least two sub-drives are spatially separated from one another in that the transmission is located between the at least two sub-drives, wherein the transmission comprises at least two harmonic gearings coupled to one another by at least one first coupling element, wherein a first harmonic gearing is located inside a non-rotating first housing, wherein a second harmonic gearing is located inside a rotating second housing, wherein the second housing is connected to the output drive, and wherein there are four sub-drives, wherein two of the at least four sub-drives are dedicated to the same drive shaft in each case.

16. An actuator for adjusting rotor blades in a helicopter, the actuator comprising:

an electromechanical drive assembly connected to an output drive via a downstream transmission, wherein the drive assembly is divided into sub-drives that can be operated independently, wherein at least two sub-drives are spatially separated from one another in that the transmission is located between the at least two sub-drives, wherein the transmission comprises at least two harmonic gearings coupled to one another by at least one first coupling element, wherein a first harmonic gearing is located inside a non-rotating first housing, wherein a second harmonic gearing is located inside a rotating second housing, wherein the second housing is connected to the output drive, and wherein there are four sub-drives, and each of the at least four sub-drives is dedicated to a separate drive shaft.

17. The actuator according to claim 16, wherein two wave generators are located on the same drive shaft in each case.

18. The actuator according to claim 16, wherein the wave generators are each located on separate drive shafts.

19. The actuator according to claim 16, wherein the two drive shafts are each formed by hollow shafts, through which a supporting element is inserted that is non-rotatably connected at one of its ends to the respective housing, wherein the first supporting element is located inside the first housing and the third wave generator is rotatably supported on this supporting element, and the third flex spline is non-rotatably connected to this supporting element, and wherein a second supporting element is located inside the second housing and the fourth wave generator is rotatably supported on this supporting element and the fourth flex spline is non-rotatably connected to this supporting element.

20. A helicopter that has one or more actuators according to claim 16.

* * * * *